US012700394B2

(12) United States Patent
Terpstra

(10) Patent No.: US 12,700,394 B2
(45) Date of Patent: Aug. 4, 2026

(54) MODULAR PARABOLIC SOUND PICKUP ASSEMBLY

(71) Applicant: Paul Terpstra, Janesville, WI (US)

(72) Inventor: Paul Terpstra, Janesville, WI (US)

( * ) Notice: Subject to any disclaimer, the term of this patent is extended or adjusted under 35 U.S.C. 154(b) by 143 days.

(21) Appl. No.: 18/347,940

(22) Filed: Jul. 6, 2023

(65) Prior Publication Data

US 2025/0014565 A1 Jan. 9, 2025

(51) Int. Cl.

| | |
|---|---|
| ***G10K 11/28*** | (2006.01) |
| ***G10K 11/162*** | (2006.01) |
| ***H04R 1/08*** | (2006.01) |
| ***H04R 1/34*** | (2006.01) |
| ***H04R 1/40*** | (2006.01) |

(52) U.S. Cl.

CPC ............ *G10K 11/28* (2013.01); *G10K 11/162* (2013.01); *H04R 1/08* (2013.01); *H04R 1/342* (2013.01); *H04R 1/406* (2013.01); *H04R 2201/029* (2013.01); *H04R 2201/401* (2013.01); *H04R 2499/11* (2013.01)

(58) Field of Classification Search

None

See application file for complete search history.

(56) References Cited

U.S. PATENT DOCUMENTS

| | | | | |
|---|---|---|---|---|
| 2,049,586 A * | 8/1936 | Hanson | H04R 1/342 | 381/160 |
| 3,483,940 A * | 12/1969 | Weisenthal | H04R 1/342 | 381/91 |
| 3,881,056 A * | 4/1975 | Gibson | H04R 1/342 | 381/361 |
| 4,037,052 A * | 7/1977 | Doi | H04R 1/342 | 381/160 |
| D356,090 S * | 3/1995 | Russell | D14/231 | |
| 6,408,080 B1 * | 6/2002 | Koizumi | H04R 1/342 | 381/160 |
| 7,023,401 B2 * | 4/2006 | Thrash | H01Q 15/141 | 343/915 |
| 9,992,569 B2 * | 6/2018 | Terpstra | H04R 1/342 | |
| 10,367,245 B2 * | 7/2019 | Kerkour | H01Q 1/288 | |
| 10,676,136 B2 * | 6/2020 | Kapila | B62D 25/145 | |
| 11,600,929 B2 * | 3/2023 | Socransky | H01Q 15/16 | |
| 2007/0183607 A1 * | 8/2007 | Andrews | H04R 1/342 | 381/160 |
| 2013/0308813 A1 * | 11/2013 | Santini | H04R 1/026 | 381/364 |

* cited by examiner

*Primary Examiner* — Paul W Huber

(57) ABSTRACT

An acoustically isolated sound collection system having a modular component design for easier and more convenient in-the-field repair and replacement of damaged parts. The sound collection system is preferably handheld and includes a handle system that is vibrationally isolated from the reflector with tool-free, releasable, connections. The reflector is preferably made with a composite that comprises chopped carbon fiber segments and, optionally, continuous carbon fiber, Kevlar, or similar, strands embedded therein. The reflector of the invention shows enhanced amplification within the range of 20-60% relative to a conventional plastic reflector.

2 Claims, 7 Drawing Sheets

MODULAR PARABOLIC SOUND PICKUP ASSEMBLY

FIELD OF THE INVENTION

The invention relates to generally parabolic, sound-collecting reflectors that are designed with tool-free, releasable connectors for convenient on-site setup and repairs. The sound collection reflector can be made with a traditional polycarbonate or with a carbon fiber containing composite that shows enhanced sound collection characteristics.

BACKGROUND OF THE INVENTION

Parabolic microphone systems, a general term denoting audio capture systems using a central microphone in front of a curved, rear reflector that may exhibit a wide variety of shapes but designed to concentrate and focus audio information at the microphone, have been used in a wide variety of circumstances by military, fire/rescue and broadcast companies. The benefits and advantages of concentrating sounds in a highly directional manner with a handheld, portable device has become a common tool for remote reconnaissance, monitoring, assessment, and lost sound capture. See U.S. Pat. Nos. 2,017,122; 2,049,586; 2,228,024; 3,483,940; 3,881,056; 4,037,052; 4,264,790; 5,452,364; 6,408,080; 9,014,402; and 9,992,569, the disclosures of which are hereby incorporated by reference.

Importantly, handheld sound collection systems may have to be in position for extended periods of time to capture the desired sounds. It would be desirable to have a parabolic sound collector made with lightweight, water-resistant components.

Of course, the purpose of on-field parabolic microphones for broadcasters is to concentrate and capture sounds from the field in a highly directional manner. Conventionally, inventors focus on the construction details of the microphone or the shape of the parabolic reflector even though undesired noise can come from different places in the assembly.

Noise can be created by the flexing of its components due to forces applied to the handle or by loads applied to the brackets that support the microphone pickup. These are the problems addressed by my prior patents, U.S. Pat. No. 9,014,402 ("Acoustically Isolated Parabolic Sound Pickup Assembly") and U.S. Pat. No. 9,992,569 ("Camera-Mountable Acoustic Collection Assembly"), the disclosures of which are hereby incorporated by reference.

Of course, quality sound is dependent on the reflector. The collector dishes for handheld, portable, parabolic microphones are typically thermoformed polycarbonate, that is heating a plastic sheet and vacuum forming that sheet over a solid mold. Clear plastic is typically used to allow the operator to see what the parabolic microphone is pointing at. This method is relatively inexpensive but requires expensive molds. Changes are almost impossible to make once the mold is manufactured. Moldable plastic sheet is also not necessarily the best material for audio amplification (i.e., highest reflectivity).

It would be desirable to have a sound-collecting concentrator or array thereof that was made from a material that would improve audio signal amplification relative to conventional polycarbonate reflectors.

The life of a parabolic sound collection reflector is also a rough one, especially when such products are used on the sidelines for commercial sports broadcasting or in the field subject to unexpected environments and local activities. The close proximity of the collector to the field of action often means unexpected collisions, falls, and undesired contact with field equipment, projectiles, vehicles, etc. Parts and connectors get damaged regardless of how well designed or robustly the equipment is constructed.

At some level, the collector cannot be made indestructible for safety reasons. Breaking parts absorb and dissipate energy that might otherwise be directed back to the participants. Preferably, the components of the collector assembly should be designed so that only those components that are actually broken can be replaced rather than replacing large groups of associated and permanently connected parts, many of which may still have a potentially long and useful life.

It would be desirable to have a handheld, portable, sound collector that was made from well-connected, sound-isolated, modular parts that would permit repair at the component or sub-assembly level.

Equipment maintenance also suggests that some sort of supply chain for replacement assemblies to repair damaged collectors. Such inventories can be expensive and do not readily support user repairs on-site with minimal tooling.

It would be desirable to have a collector design that was made of modular components that can be manufactured with robust properties by 3D printing or other on-demand forms of component manufacture in a small shop or on-site.

It would be desirable to have a sound collector having a modular design from components and sub-assemblies that can be manufactured by 3D printing, bench-top casting techniques, or similar methods suitable for a small shop or on-site repair facility.

SUMMARY OF THE INVENTION

It is an objective of the invention to provide a parabolic sound pickup assembly that is made from durable, weather and temperature resistant materials that resist breaking or shattering even at sub-freezing conditions and which exhibit better amplification of received signals than a conventional polycarbonate reflector.

It is a further objective of the invention to provide a parabolic reflector and associated support system that is at least substantially eliminates the transmission of creaks, vibrations or noises made by the relative movement of attached parts at connections from the associated audio microphone positioned in front of the reflector.

Another objective is to provide a parabolic sound pickup assembly that can be readily assembled and disassembled without tools, loose connectors, or external fasteners. Quick assembly and disassembly is particularly beneficial for transport.

In accordance with these and other objectives of the invention that will become apparent from the description herein, a sound collection assembly according to the invention generally comprises:

a. a sound reflector having (i) a closed, curved rear side; and (ii) an open forward edge having an acoustic center;

b. a support for a first sound pickup microphone extending to said acoustic center; and c. a handle frame that comprises a first handle and a second handle, each of which has a snap-connect fitting that releasably connects a handle to a rear side of said reflector and which extends rearwardly from said reflector for a predetermined distance;

wherein each handle includes: (a) a top arm that attaches to the rear of said lip, (b) a vertical arm having a vertically-oriented gripping member, and (c) a transverse bottom arm that extends across the back of said reflector to a secured connection in a handle connector;

further comprising a forward support arm that extends to a snap-connect fitting on a bottom of said reflector;

whereby each connection between said first arm, said second arm, and each of said vertical arms is acoustically isolated from contact with said reflector by at least one isolation bushing at each connection.

A sound collection assembly according to another embodiment of the invention comprises:

a. a sound reflector having (i) a closed, curved rear side; (ii) an open forward edge having an acoustic center; and (iii) a substantially planar, transverse lip integrally formed along substantially the entire length of said edge and extending outwardly from said acoustic center of said reflector;

b. a first eccentric locating pin mounted on said transverse lip laterally opposite a second eccentric locating pin mounted on said transverse lip diametrically opposite said first eccentric locating pin;

c. a support for a first sound pickup microphone extending between said first eccentric locating pin and said second eccentric locating pin, said support comprising (i) a first arm that is releasably secured to a first engaging plate that connects to said first eccentric locating pin and which extends toward a geometric center of said transverse lip, (ii) a second arm that is releasably secured to a second engaging plate that connects to said second eccentric locating pin and which extends toward a geometric center of said transverse lip, (iii) a microphone connector located near a geometric center of said transverse lip, and (iv) a microphone support arm secured by said microphone connector that extends a microphone mounted thereon to the acoustic focus of said reflecting member; and d. at least a pair of handles, each of which is releasably attached to said lip and which extends rearwardly from said lip for a predetermined distance;

whereby each connection between said first arm, said second arm and each of said handles is acoustically isolated from contact with said lip by at least one isolation bushing at each connection.

Preferably, at least most, if not all, of the releasable connections in the assembly are made with interconnecting snap-connect fittings that allow rigid, squeak-free connections but which also permit tool-free disassembly for transportation or repair.

In a further embodiment, the sound collection assembly is dimensioned sufficiently small with a hot shoe mounting plate that allows the reflector assembly to be carried by a conventional hot shoe adapter of a video camera.

In a further embodiment, the sound collection reflector is made with a carbon fiber composite that is relatively stiffer than a conventional polycarbonate reflector. The increased stiffness allows the reflector to collect a higher quality of sound than a conventional polycarbonate material.

The acoustic isolation structures provided by the present invention provide enhanced amplification of received audio signals while also reducing or substantially eliminating the transmission of vibrations, creaks, and flexural groans of the reflector to the audio microphone system. The result is more sensitive, better sound quality in the recorded sounds with less work by the audio engineer. When coupled with a modular design that allows on-field repairs with one-way assembly, the sound collection assembly of the present invention advances the options for commercial use of quality sound collection assemblies for sports, movies, and special events.

DETAILED DESCRIPTION OF THE INVENTION

Figure 1:
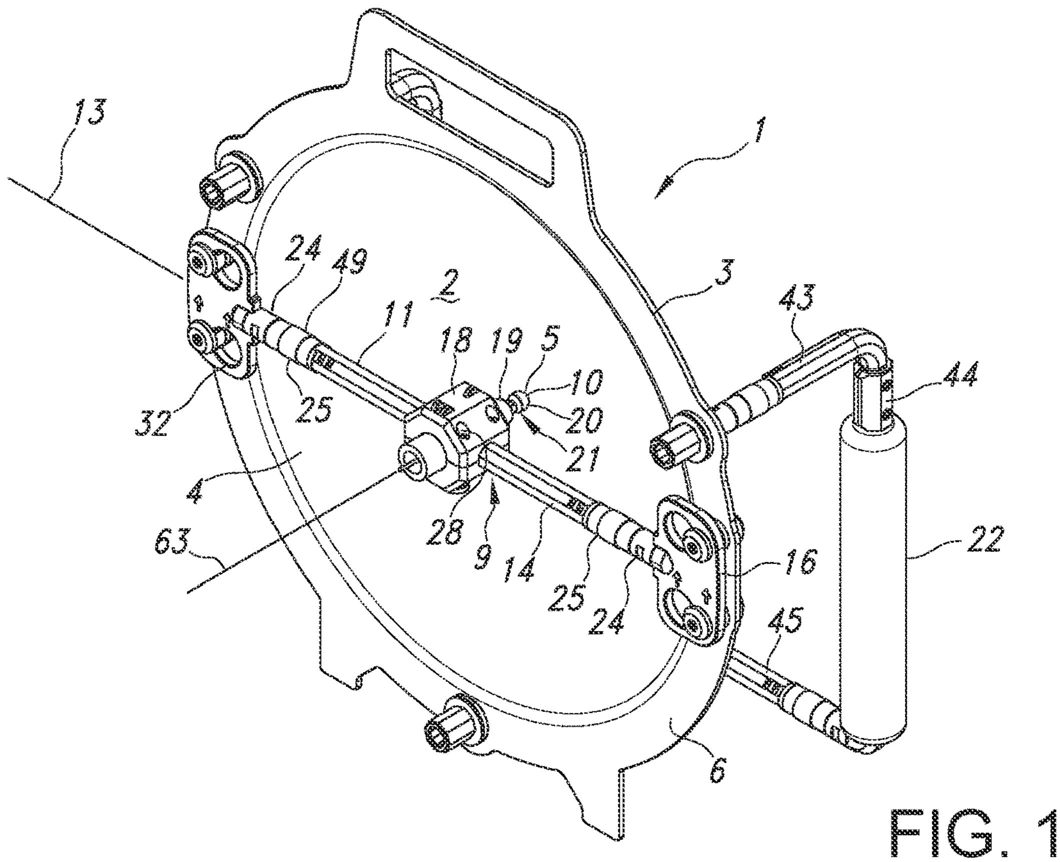
FIG. 1 shows a handheld sound collection assembly according to the invention.

The present invention is directed to a sound collection assembly that is modular in design so that discrete parts or sub-assemblies can be removed and replaced without the use of tools. Optionally, the reflector is made from a carbon fiber composite that allows the collection of an even higher amplification of the sound signal.

The modular component design of the present invention affords easier and more convenient in-the-field repair and replacement of damaged parts. The use of sound-isolated, snap-connect fittings provides tool-free, or substantially tool-free, removal and replacement of parts that might have become damaged during use by the user either during the event or thereafter. It would not be necessary to send the assembly back to the manufacturer for repair. This can represent a substantial cost savings to organizations that use multiple parabolic reflectors for sound collection and amplification.

The sound collection system is preferably handheld and includes a handle system that is vibrationally isolated from the reflector with tool-free, releasable, connections. The benefits of vibrationally-insulated connections are discussed in my prior patents, noted above.

The reflector is preferably made with a composite that comprises chopped carbon fiber segments and, optionally, continuous carbon fiber, Kevlar, or similar, strands embedded therein. The relatively stiffer modulus of the carbon composite reflector translates into improved sound collection. Our tests have shown that a carbon fiber composite reflector demonstrates enhanced amplification within the range of 20-60% relative to a conventional plastic reflector.

The reflector used in the present invention can be an integral reflector dish in a hemispherical or parabolic shape having an identifiable acoustic center. Such reflectors benefit from having a perimeter lip to which a microphone support and handle connections can be made.

The reflector of the present invention can also be made with a modular dish or array that is made of smaller sub-parts that can be made with a 3D printer. Such shapes can be hemispherical of 2-12, curved, interconnected panels or formed in an array of interconnected, smaller, half-reflectors that are stacked in rectangular frames with oppositely-oriented rear surfaces (e.g., one curves down, the other curves up) to form a smaller reflector sub-assembly having a 180 degree curvature. Such sub-assemblies can be used alone (i.e., a pair of rectangular half reflectors) for a small array on a handheld camera or combined into arrays as large as needed for the application, e.g., 2-100 smaller sub-assemblies of 180 degree curvature each. The handle systems would attach to the rectangular frame, preferably with acoustically-isolated connectors, for handheld applications or to a mounting frame for vehicle-mounted uses of large arrays.

It will be understood that the use of numerical ranges are intended to represent a shorthand reference to a range of individual integer numbers. A range of 2-12 includes the integers 2, 3, 4, 5, 6, 7, 8, 9, 10, 11, and 12. The same rationale applies to a numerical range of 2-100.

The present invention is conveniently described with reference to the attached figures. Reference numbers that are the same denote the same part or structure.

As shown in the figures, sound collection assembly 1 is made with a sound reflector 2 having (i) a closed, curved rear surface 3; (ii) an open forward surface 4 having an acoustic center 5; and (iii) a substantially planar, transverse lip 6 that is integrally formed along substantially the entire length of said edge and which extends outwardly from acoustic center 5 of the reflector 2.

Reflector 2 can be made from a conventional, thermoformed, plastic such as polycarbonate material. More preferably, reflector 2 is made with a composite having reinforcing fibers, such as carbon, glass, or polyamide fibers or a combination of chopped fibers and continuous fibers of the same or different composition. Most preferably, reflector 2 is made with a 3D printer that allows the use of carbon fiber-containing material to form a reflector having customized properties for enhanced durability at identifiable stress points, e.g., the handle connections and peripheral lip. Such areas can be formed by 3D printing with increased thickness or supporting structures that are not possible with the conventional thermoforming process.

A first eccentric locating pin 7 is mounted on one side of transverse lip 6 laterally opposite a second eccentric locating pin 8 mounted on said transverse lip 6 at a position that is generally diametrically opposite said first eccentric locating pin 7. As shown, the embodiment includes a pair of first eccentric locating pins 7 and, on the opposite side of lip 6, a pair of second eccentric locating pins 8.

Extending across front edge 4 is a mic support assembly 9 that is used to hold a first sound pickup microphone 10. Support assembly 9 extends between said first eccentric locating pin 7 and said second eccentric locating pin 8. Mic support assembly 9 includes: (i) a first arm 11 that is releasably secured by a first connection 12 to a first engaging plate 13 that connects to said first eccentric locating pin 7 and which extends toward a geometric center 17 of reflector 2 and transverse lip 6, (ii) a second arm 14 that is releasably secured by a second connection 15 to a second engaging plate 16 that connects to second eccentric locating pin 8 and which extends toward geometric center 17, (iii) a microphone connector 18 located near geometric center 17, and (iv) a microphone support arm 19 secured by microphone connector 18 that extends microphone 20 mounted thereon to the acoustic focus 21 of reflecting member 2. Microphone adapter 63 can be a hollow tube having a molded connector that is configured to grip microphone 10 in the desired position. Thumb screw 64 holds the microphone adapter 63, or a larger microphone element, in position.

Reflector 2 is connected to at least a pair of handles 22, each of which is releasably attached to lip 6 and which extends rearwardly therefrom for a predetermined distance.

Figure 8:
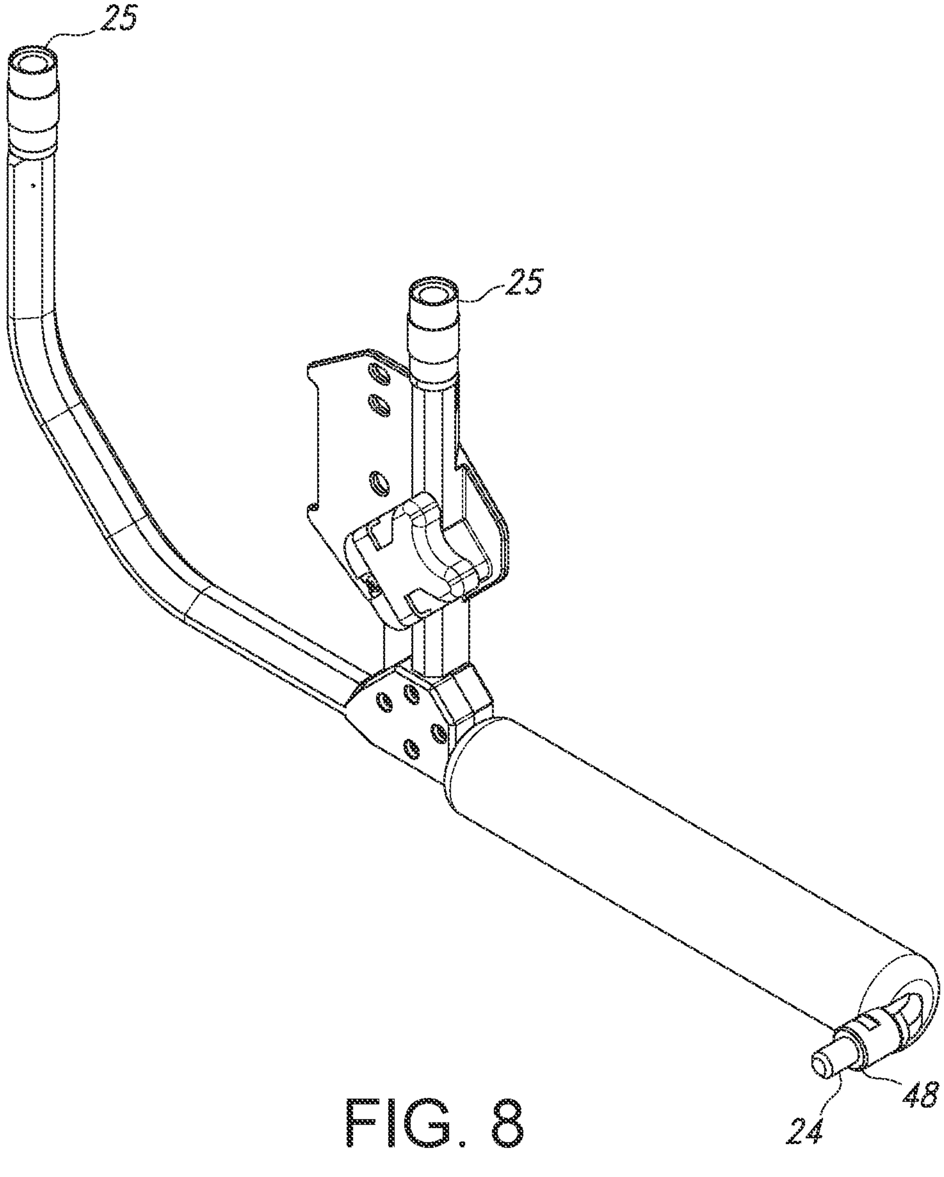
FIG. 8 illustrates a portion of a handle assembly that shows the use of engageable snap-connect fittings that are positioned to dictate assembly in only one orientation.

The connections used in mic support assembly 9 (between first, second engaging plates 13, 16 and first, second arm 11, 14) and handles 22 are preferably mating, snap-connect fittings 23 that can be connected and separated without the use of external tools. (See FIG. 8.) Snap-connect fittings 23 desirably have bayonet portion 24 and receiving portion 25 that couple together in a substantially squeak-free connection but only in one, correct, orientation. The addition of a sound-isolating washer or O-ring 48 on each bayonet portion 24 and/or a soft plastic cap 49 within each receiver portion 25 can be used to further reduce relative movement at the joint connection. With some thought in the placement of the bayonet and receiving portions, the parts of mic support assembly 9 and handles 22 can be positioned to allow assembly only in one, proper, orientation.

Mic support assembly 9 is mounted onto lip 6 when first, second engaging plate 13, 16 slip over first, second eccentric locating pins 7, 8 and are moved laterally to engage the snap-connect fitting 23.

Figure 2:
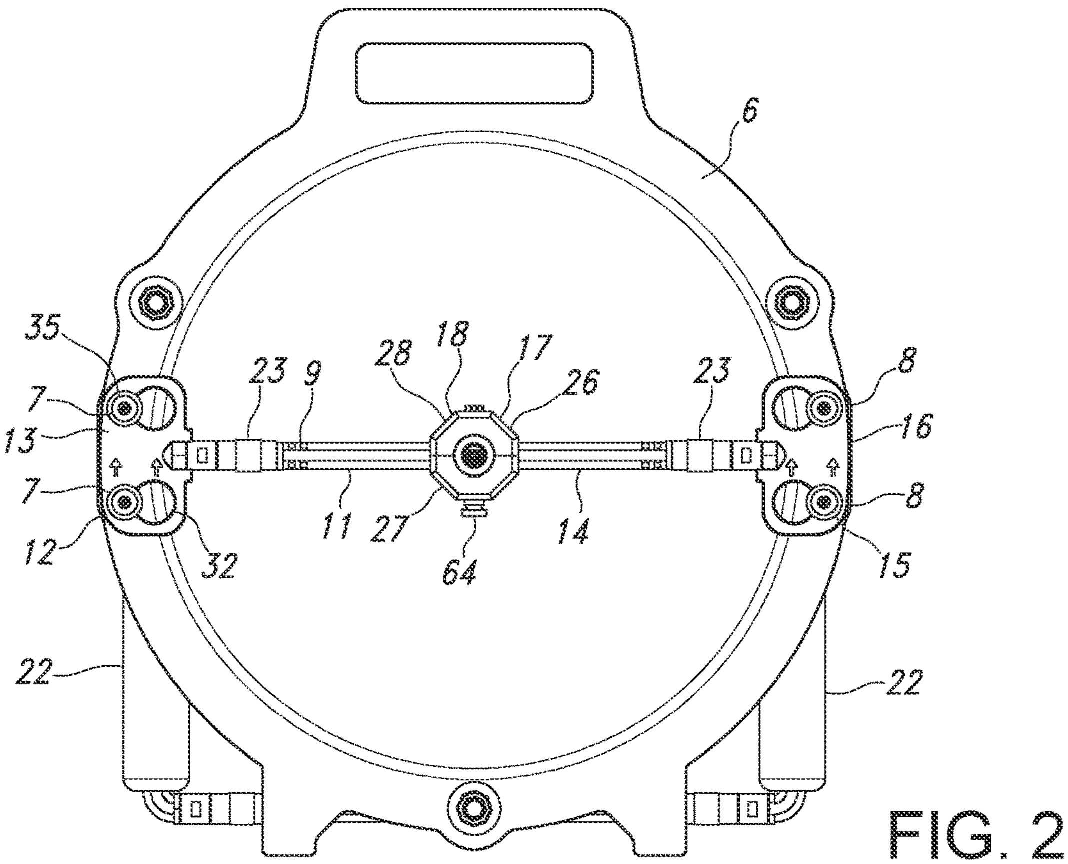
FIG. 2 is a front view of a sound collection assembly of FIG. 1.
Figure 3:
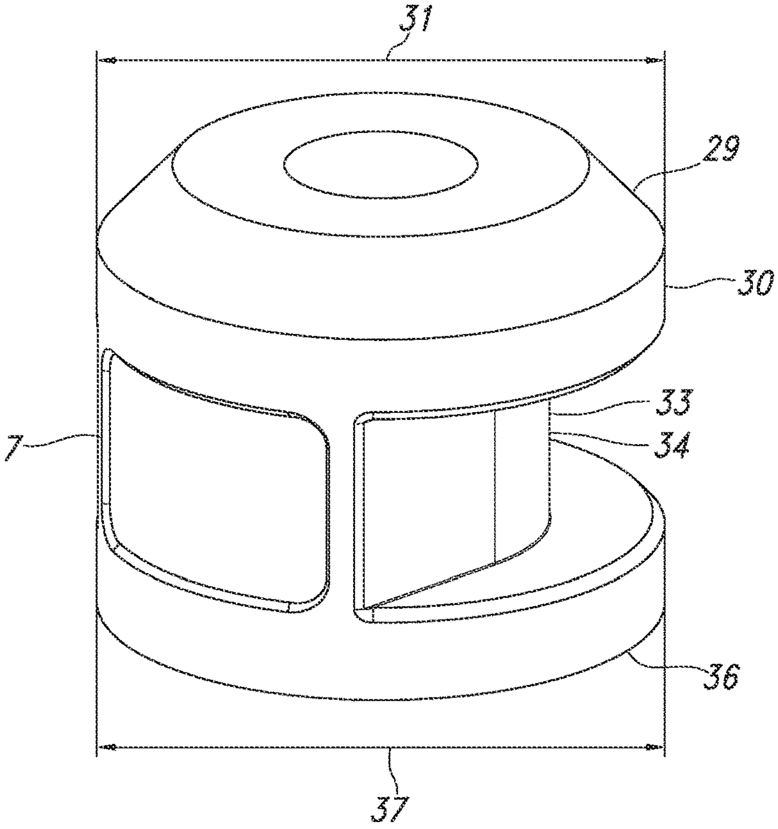
FIG. 3 is an isometric view of an eccentric locating pin used in the present invention.
Figure 4:
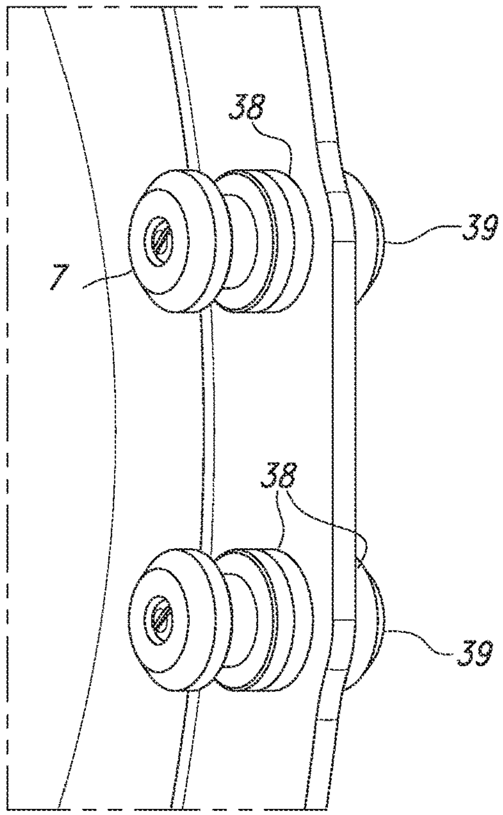
FIG. 4 shows a pair of eccentric locating pins mounted on a peripheral lip of the reflector.
Figure 5:
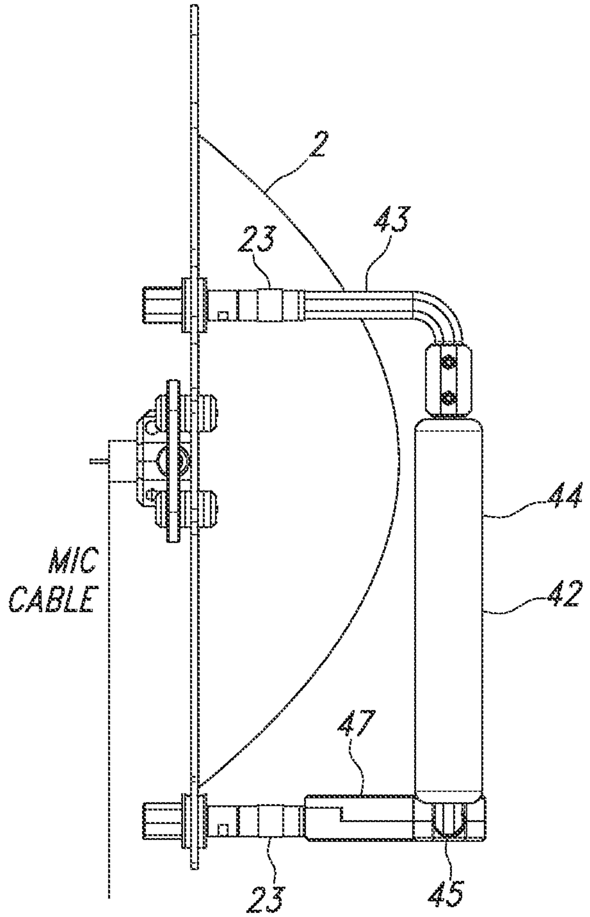
FIG. 5 presents a side view of a sound collection assembly.
Figure 6:
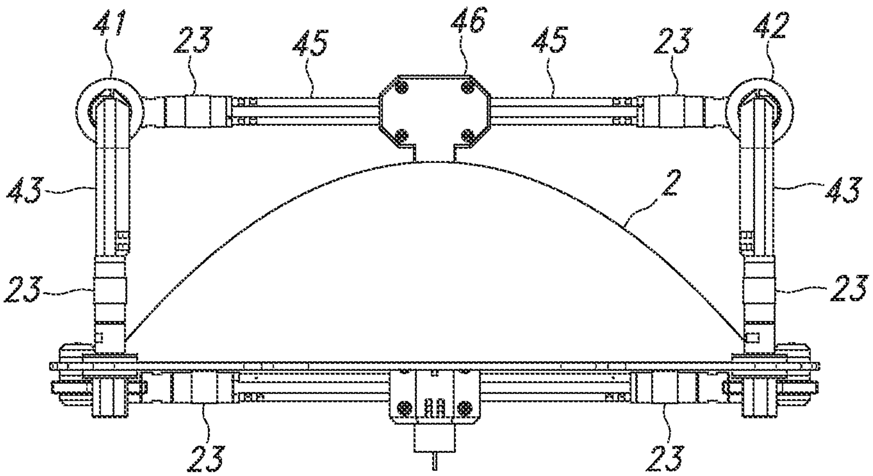
FIG. 6 is a view from the top of the assembly in FIG. 5.
Figure 7:
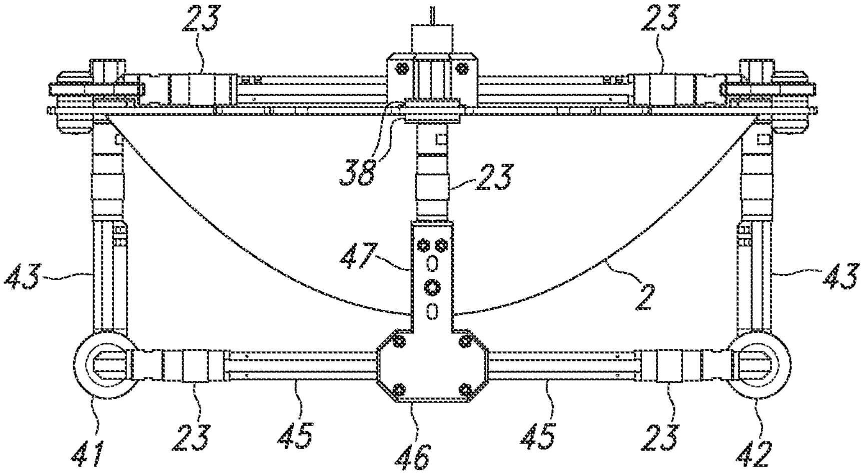
FIG. 7 is a view from the bottom of the assembly in FIG. 5.

Eccentric locating pins 7, 8 are shown in greater detail in FIGS. 3-4. First eccentric locating pin 7 has the same shape as second eccentric locating pin 8. Eccentric locating pin 7 has a chamfered top portion 29 tapering outwardly to a second portion 30 having a first diameter 31 that is just slightly smaller than the first opening diameter 32 (see FIG. 2) in first engaging plate 13. Below second portion 30 is a third portion 33 of reduced radius 34 that forms a friction fit with second opening 35 (see FIG. 2) in first engaging plate 13. The bottom of eccentric locating pin 7 has a bottom portion 36 that has a third diameter 37 that is the same or larger than first diameter 31 of second portion 30. An enlarged third diameter 37 prevents the engaging plates 13, 16 from becoming positioned below third portion 33 and failing to engage properly with reduced radius 34. When mounted on lip 6, isolation washers 38 around the eccentric pins 7, 8 and the locating stud 39 on the backside of lip 6 help to isolate the eccentric locating pins from transmitting undesired vibrations to reflector 2 that might become noise collected by microphone 10.

As shown in the figures, engaging plates 13, 16 have openings to each engage with two eccentric locating pins 7, 8. It is within the scope of the current invention to provide fewer or more eccentric locating pins on each side or to provide one side with a different number of eccentric locating pins than the other side for even greater control over part orientation.

One configuration of handles to support sound collection assembly 1 includes a handle frame 40 having a first handle 41 and a second handle 42. Snap-connect fittings 23 releasably connect handles 41, 42 to the rear of transverse lip 6 on diametrically opposite sides of reflector 2. Each handle includes: (a) a top arm 43 that attaches to the rear of lip 6, (b) a vertical arm 44, preferably padded for comfort and to reduce vibration translation, and (c) a transverse bottom arm

45 that extends across the back of reflector 2 to a secured connection in handle connector 46.

From handle connector 46, forward support arm 47 extends to snap-connect fitting 23 on the bottom of transverse lip 6. Sound isolation washers 38 help to isolate reflector 2 from receiving vibrations through the handle connections that could translate into undesired noise and interfere with the collection of quality sound signals.

Figure 13:
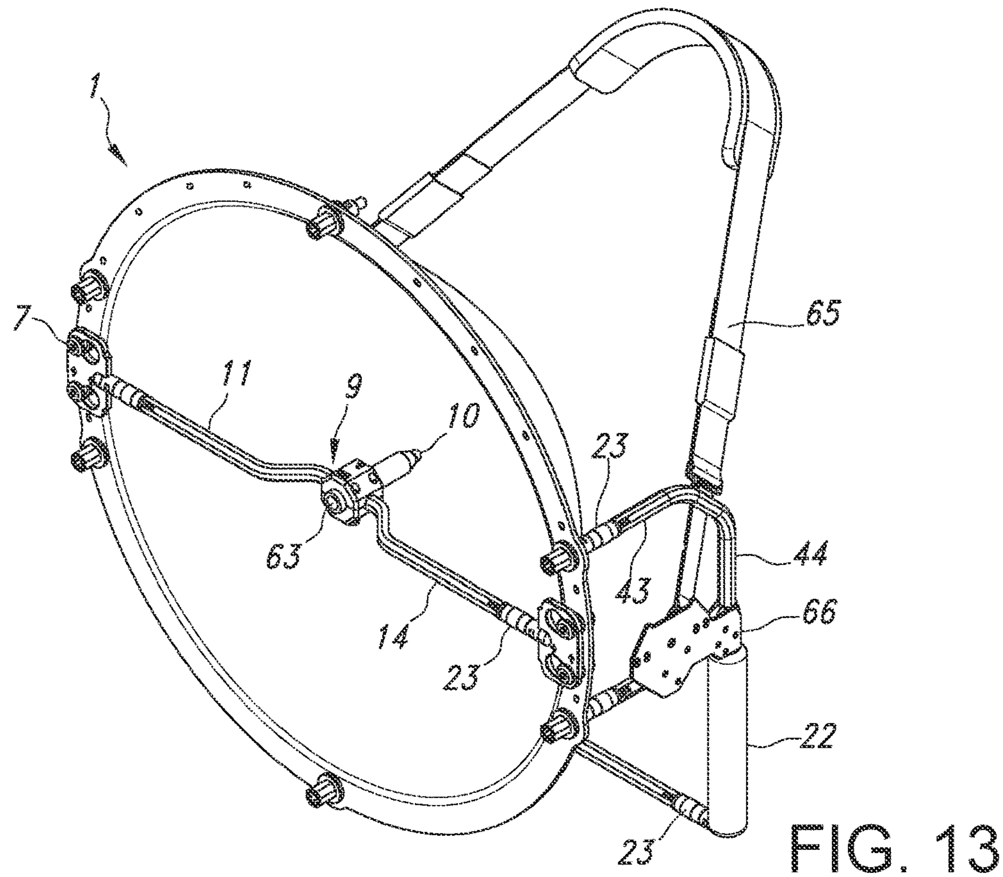
FIGS. 13 and 14 are isometric and side views of a larger form of handheld reflector with a neck strap for user comfort.
Figure 14:
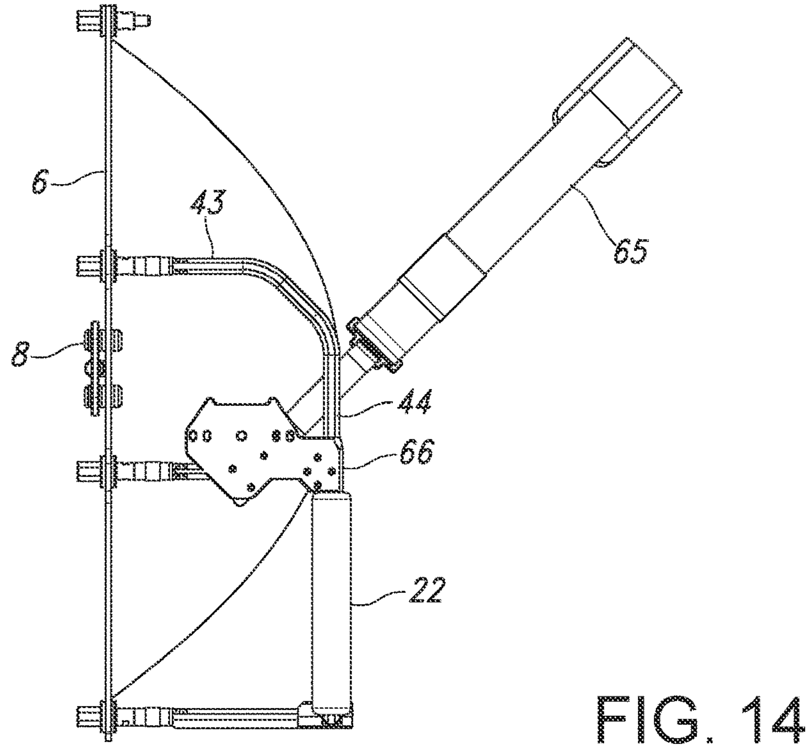

If desired, neck strap 65 can be used to help carry the weight of sound collection assembly 1. As shown in FIGS. 13 and 14, neck strap 65 can be attached to handle plate 66 mounted at a juncture of a top arm 43 and vertical arm 44.

The reflector of the present invention need not be made as a single, unitary, reflector. Hemispherical, parabolic, and flat arrays can be formed of plastic or composite materials by 3D printing that allows the manufacturer greater flexibility in inventory control as well as shape and material properties.

Figure 9:
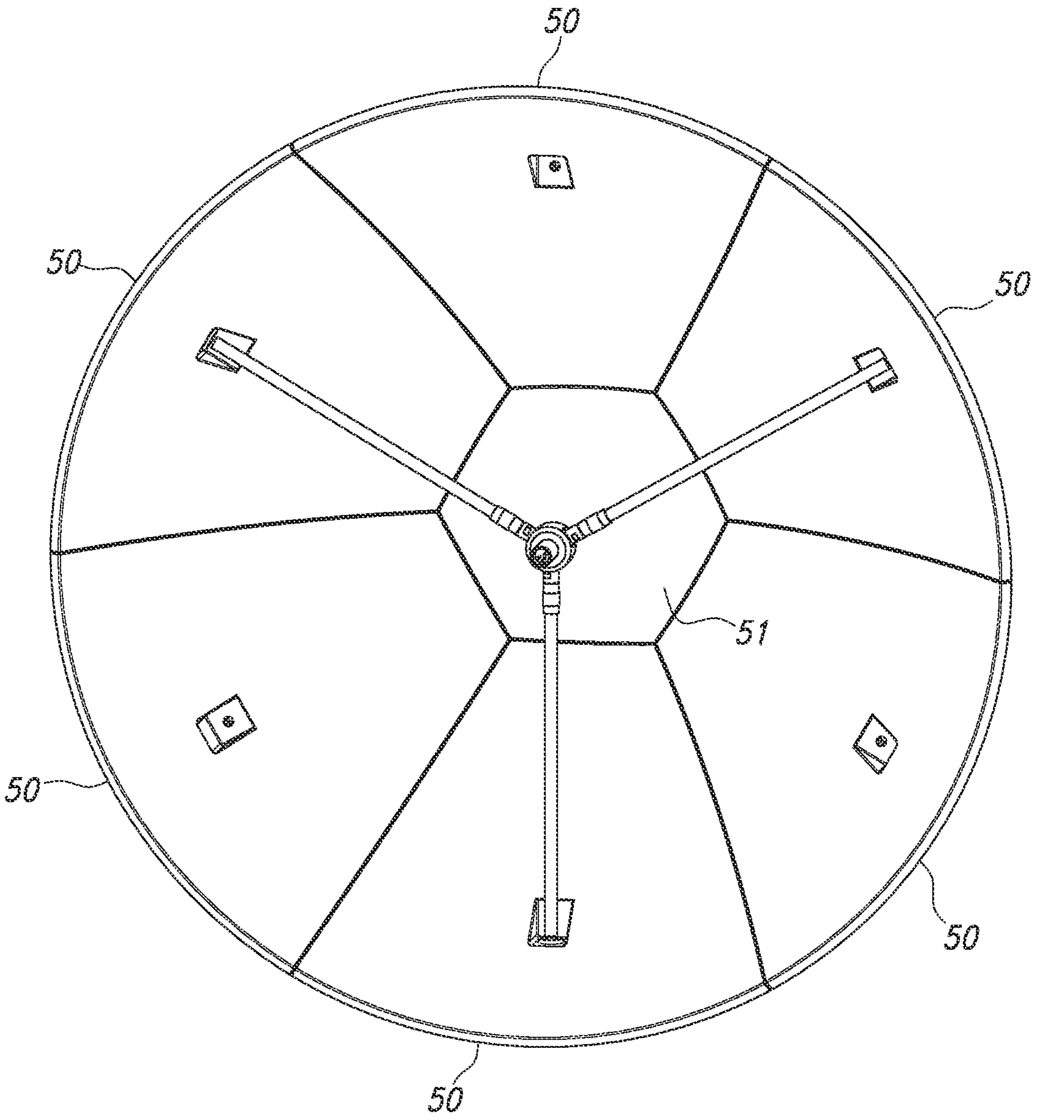
FIG. 9 is a composite reflector made from seven curved panels.

For example, FIG. 9 shows the use of curved, interconnected, side reflector panels 50 around a central, curved, panel 51. A three-legged microphone support assembly 52 has its support arms 53 seated in connection sites 54 that were formed into side reflector panels 50. Reflector panels 50, 51 can be attached by strong adhesive, e.g., shock-resistant epoxy, or by mechanical connectors, e.g., bolts, screws, or clamps. When configured as a complete reflector dish, the panels are reminiscent of a half soccer ball.

Figure 10:
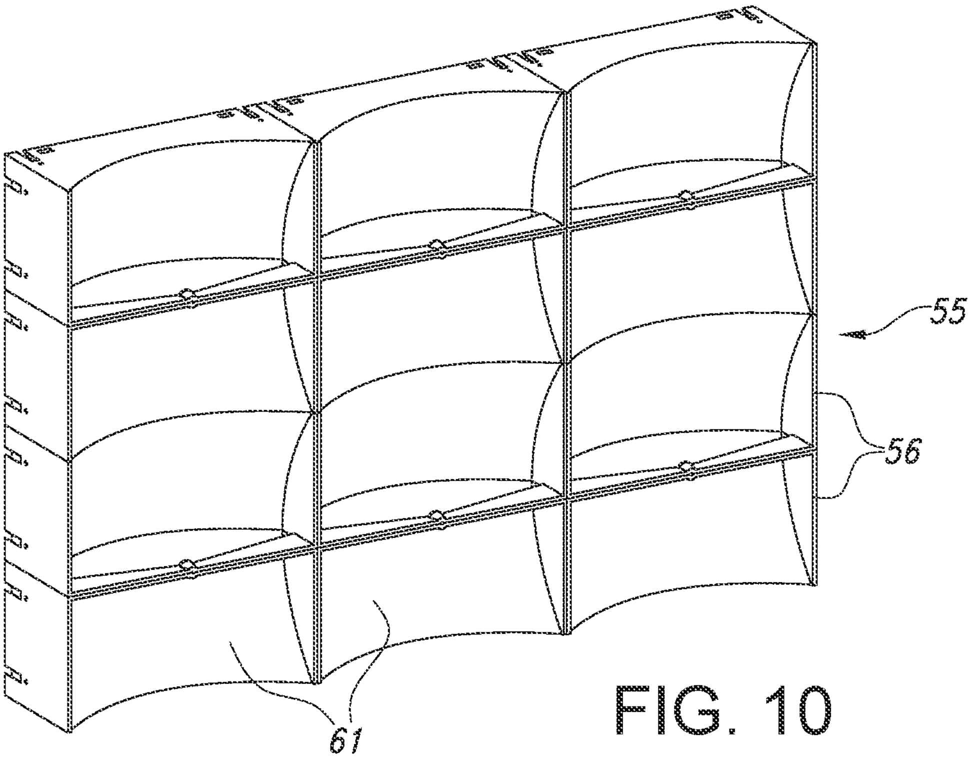
FIG. 10 is a front view of a flat array of interconnected parabolic reflectors.
Figure 11:
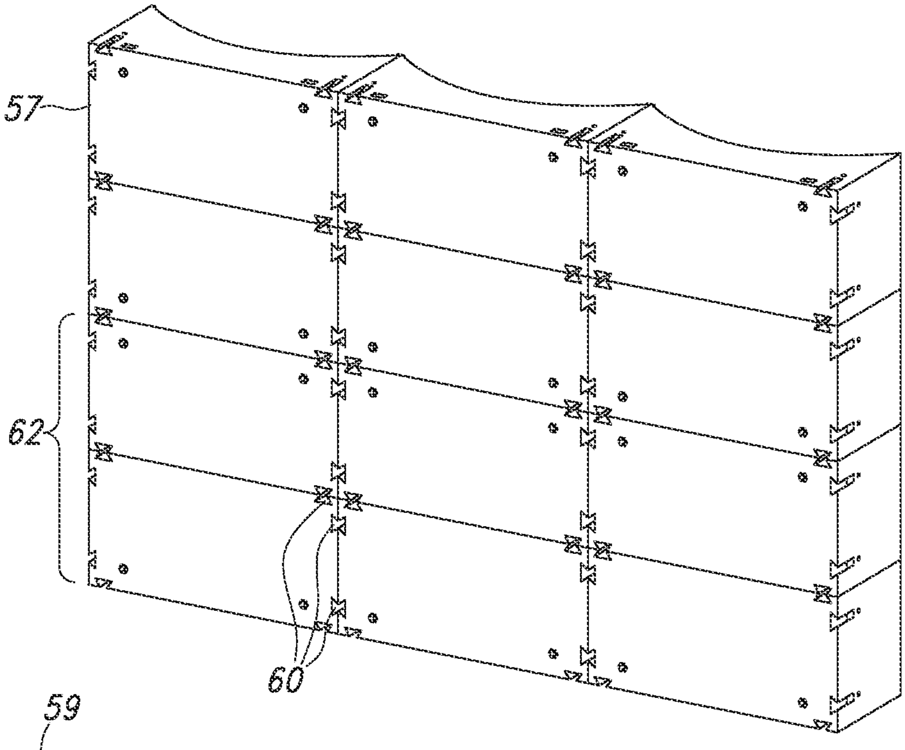
FIG. 11 is a rear view of the flat array of FIG. 10.
Figure 12:
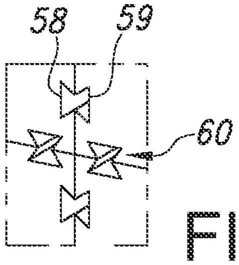
FIG. 12 is a closeup view of a section of FIG. 11 showing the use of bowtie-shaped openings between adjacent panels for connecting them together.

FIGS. 10-12 show an array 55 of smaller, reflector sub-assemblies 56, each having a curvature of about 90 degrees with a rectangular external housing 57 that allows the units to be stacked. Each corner edge includes a first connector opening 58 having a truncated pyramid that aligns with similarly-shaped second connector openings 59 in the adjacent units as well as the units above and below. When aligned, openings 58, 59 form a bowtie-shaped opening 60 that will receive a shaped connection pin (not shown) that will connect the sub-assemblies 56. The connector pin can form a permanent or removable connection as one of several possible connection methods.

Two sub-assemblies 56 stacked with oppositely curved reflection surfaces 61 will form a small collector unit 62. Multiple, small collector units 62 can be connected in virtually any number to make a sound collection array that is as small, or as large, as needed for the user's application.

What is claimed is:

1. A sound collection assembly comprising:

a. a sound reflector having (i) a closed, curved rear side; (ii) an open forward edge having an acoustic center; and (iii) a substantially planar, transverse lip integrally formed along substantially the entire length of said edge and extending outwardly from said acoustic center of said reflector;

b. a first eccentric locating pin mounted on said transverse lip laterally opposite a second eccentric locating pin mounted on said transverse lip diametrically opposite said first eccentric locating pin;

c. a support for a first sound pickup microphone extending between said first eccentric locating pin and said second eccentric locating pin, said support comprising: (i) a first arm that is releasably secured to a first engaging plate that connects to said first eccentric locating pin and which extends toward a geometric center of said transverse lip, (ii) a second arm that is releasably secured to a second engaging plate that connects to said second eccentric locating pin and which extends toward a geometric center of said transverse lip, (iii) a microphone connector located near a geometric center of said transverse lip, and (iv) a microphone support arm secured by said microphone connector that extends a microphone mounted thereon to an acoustic focal point of the sound reflector; and d. at least a pair of handles, each of which is releasably attached to said lip and which extends rearwardly from said lip for a predetermined distance; whereby each connection between said first arm, said second arm and each of said handles is acoustically isolated from contact with said lip by at least one isolation bushing at each connection;

wherein the first eccentric locating pin has a chamfered top portion (29) that tapers outwardly to a second portion (30) having a first diameter (31) that is smaller than a first opening diameter (32) in the first engaging plate (13), a third portion (33) of reduced radius (34) below said second portion (30) that forms a friction fit with a second opening (35) in said first engaging plate (13), and a bottom portion (36) having a third diameter (37) that is the same or larger than said first diameter (31) of said second portion (30), wherein said third diameter (37) is dimensioned to prevent said first engaging plate from becoming positioned below said third portion (33) and failing to engage with said reduced radius (34).

2. A sound collection assembly according to claim 1 further comprising a sound isolation washer around said eccentric locating pin.

* * * * *